US011709991B2

United States Patent
Long et al.

(10) Patent No.: US 11,709,991 B2
(45) Date of Patent: Jul. 25, 2023

(54) DETECTING TRUNCATION AND OVERLAP DEFECTS ON WEBPAGE

(71) Applicant: International Business Machines Corporation, Armonk, NY (US)

(72) Inventors: Li Juan Long, Beijing (CN); Jin Zhang, Beijing (CN); Jun Fan, Beijing (CN); Rui Li Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 17/224,553

(22) Filed: Apr. 7, 2021

(65) Prior Publication Data
US 2022/0327279 A1 Oct. 13, 2022

(51) Int. Cl.
G06F 40/00 (2020.01)
G06F 40/143 (2020.01)
G06F 40/106 (2020.01)
G06F 16/957 (2019.01)
G06F 40/197 (2020.01)
G06F 40/117 (2020.01)

(52) U.S. Cl.
CPC ........ G06F 40/143 (2020.01); G06F 16/9577 (2019.01); G06F 40/106 (2020.01); G06F 40/117 (2020.01); G06F 40/197 (2020.01)

(58) Field of Classification Search
CPC .... G06F 40/143; G06F 40/197; G06F 40/117; G06F 40/106
See application file for complete search history.

(56) References Cited

U.S. PATENT DOCUMENTS 9,239,961 B1 1/2016 Cole et al.
11,016,651 B1 * 5/2021 Black ................ G06F 16/34
11,182,178 B1 * 11/2021 Singh ................ G06F 9/451
(Continued)

FOREIGN PATENT DOCUMENTS

WO 2008073838 A1 6/2008

OTHER PUBLICATIONS

Anonymous, "A Method and System to Automatically Resolve Message Truncation in Web Page," ip.com, IPCOM000241347D, Apr. 18, 2015, pp. 1-9.

*Primary Examiner* — Scott T Baderman
*Assistant Examiner* — Barbara M Level
(74) *Attorney, Agent, or Firm* — Robert A. Voigt, Jr.; Shackelford, Bowen, McKinley & Norton, LLP

(57) ABSTRACT

A computer-implemented method, system and computer program product for detecting truncation and overlap defects. Location and size information for the elements of the webpage are obtained. An intersection over union (IoU) calculation is performed for two webpage elements using the obtained location and size information for at least one of these webpage elements. Furthermore, the location relationship between these two webpage elements is determined. A table, which defines truncation defect and overlap defect scenarios, is then reviewed to determine if there are any truncation or overlap defects in these two webpage elements using the IoU calculation, the location relationship and the text condition, which indicates whether text is included in one of the two webpage elements. If any truncation or overlap defects are found in the webpage, then such truncation and/or overlap defects are marked on a screen capture of the webpage.

20 Claims, 6 Drawing Sheets

$$IoU = \frac{|A \cap B|}{|A \cup B|} = \frac{(8-4)*(8-3)}{((8*8)+(6\times7))-((8-4)*(8-3))} = 0.232$$

(56) References Cited

U.S. PATENT DOCUMENTS

| | | | |
|---|---|---|---|
| 11,455,456 B2* | 9/2022 | Bikumala | G06F 16/9577 |
| 11,494,567 B2* | 11/2022 | Sethi | G06F 40/58 |
| 2013/0014084 A1 | 1/2013 | Sahibzada et al. | |
| 2013/0055117 A1 | 2/2013 | Sahibzada et al. | |
| 2017/0031879 A1 | 2/2017 | Xiong et al. | |
| 2019/0228058 A1* | 7/2019 | Shang | G06F 16/986 |
| 2020/0387735 A1* | 12/2020 | Huang | G06V 30/19173 |
| 2021/0103515 A1* | 4/2021 | Jiang | G06F 40/143 |

* cited by examiner $$IoU = \frac{|[\min(a1,x1) - \max(a0,x0)] \cdot [\min(y1,b1) - \max(y0,b0)]|}{|(x1-x0)*(y1-y0) + (a1-a0)*(b1-b0) - [\min(a1,x1) - \max(a0,x0)] * [\min(y1,b1) - \max(y0,b0)]|}$$

DETECTING TRUNCATION AND OVERLAP DEFECTS ON WEBPAGE

TECHNICAL FIELD

The present disclosure relates generally to software testing, and more particularly to automatically detecting truncation and overlap defects on a webpage using intersection over union calculations of the webpage elements and the webpage element location relationship.

BACKGROUND

Truncation defects refer to the situation in which at least a portion of a number string or a text string is shortened. For example, when computing software is adapted to different languages, regional peculiarities and technical requirements of a target locale during internalization and localization, truncation may occur. For instance, when a word is translated from one language to another, it can take more space than in the original version. For example, English "no" in German is "nein," which has more characters. In another example, the English phrase "Have a nice day!" corresponds to the German equivalent "Ich wünsche Ihnen Einen schönen Tag!". The words may then be truncated when translated from English to German in order to fit the text into the webpage element, such as within a checkbox graphical user interface element.

Overlap defects refer to the situation in which at least a portion of a webpage element extends over another webpage element so as to at least partially cover that webpage element. Webpage elements, as used herein, refer to portions of the depicted webpage, which may contain a data item, text, image or perhaps nothing. Examples of webpage elements include checkboxes, radio boxes, dropdown lists, list boxes, buttons, toggles, text fields, date fields, sliders, search fields, tags, icons, progress bars, message boxes, notifications, windows, accordions, etc. Such overlap defects may also occur during internalization and localization.

Such defects (truncation and overlap defects) on a depicted webpage make it difficult for the user to understand what is shown on the webpage.

SUMMARY

In one embodiment of the present disclosure, a computer-implemented method for detecting truncation and overlap defects on a webpage comprises obtaining location and size information for elements of the webpage. The method further comprises performing an intersection over union (IoU) calculation for a first webpage element and a second webpage element on the webpage using the obtained location and size information for at least one of the first webpage element and the second webpage element. The method additionally comprises determining a location relationship between the first and second webpage elements on the webpage using the obtained location and size information for at least one of the first webpage element and the second webpage element. Furthermore, the method comprises reviewing a table using the IoU calculation for the first and second webpage elements on the webpage and the location relationship between the first and second webpage elements to identify a normal condition, a truncation defect or an overlap defect, where the table defines truncation defect and overlap defect scenarios. Additionally, the method comprises marking a truncation defect or an overlap defect on a screen capture of the webpage in response to identifying the truncation defect or the overlap defect, respectively, in the table.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
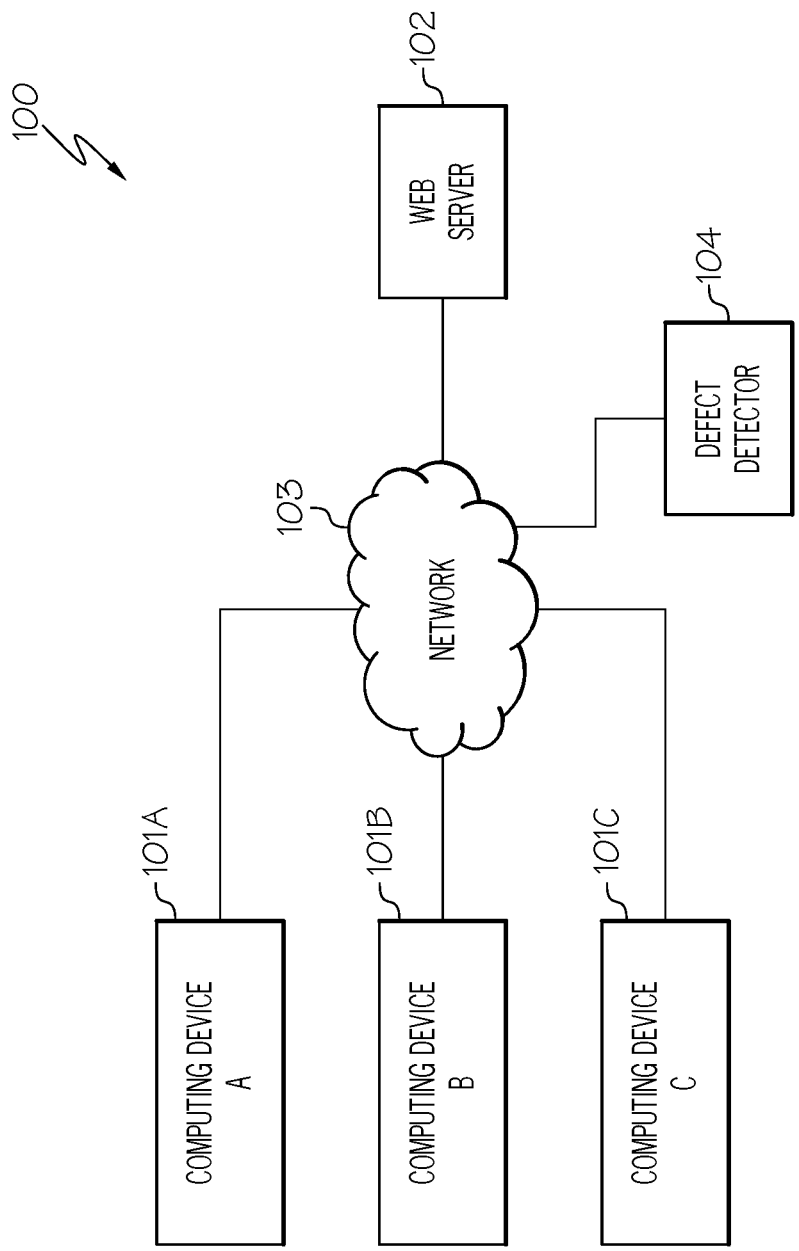
FIG. 1 illustrates a communication system for practicing the principles of the present disclosure in accordance with an embodiment of the present disclosure.

As stated in the Background section, truncation defects refer to the situation in which at least a portion of a number string or a text string is shortened. For example, when computing software is adapted to different languages, regional peculiarities and technical requirements of a target locale during internalization and localization, truncation may occur. For instance, when a word is translated from one language to another, it can take more space than in the original version. For example, English "no" in German is "nein," which has more characters. In another example, the English phrase "Have a nice day!" corresponds to the German equivalent "Ich wünsche Ihnen Einen schönen Tag!". The words may then be truncated when translated from English to German in order to fit the text into the webpage element, such as within a checkbox graphical user interface element.

Overlap defects refer to the situation in which at least a portion of a webpage element extends over another webpage element so as to at least partially cover that webpage element. Webpage elements, as used herein, refer to portions of the depicted webpage, which may contain a data item, text, image or perhaps nothing. Examples of webpage elements include checkboxes, radio boxes, dropdown lists, list boxes, buttons, toggles, text fields, date fields, sliders, search fields, tags, icons, progress bars, message boxes, notifications, windows, accordions, etc. Such overlap defects may also occur during internalization and localization.

Such defects (truncation and overlap defects) on a depicted webpage make it difficult for the user to understand what is shown on the webpage.

In software testing, test automation is the use of software separate from the software being tested to control the execution of tests and the comparison of actual outcomes with predicted outcomes.

For example, in the area of internalization and localization, software tools, such as globalization tools, have been developed to ensure that the software product is stable in terms of both its functionalities as well as representation of data in spite of varying cultures/locales. Such globalization tools engage in globalization testing to validate whether an application acknowledges all the language input texts and it can be used across the globe or not. The sole aim of globalization testing is to uncover the potential problems that could hinder the globalization of the application.

For example, globalization testing involves internationalization testing, which is to verify if the code can deal with all the international support with no breaking of functionality that may cause data loss or data integrity issues.

In another example, globalization testing involves localization testing, which involves translation of the software and its presentation to the end user. The translation of the program considers icons, graphics, user manuals, help files, documentation and other cultural specifications.

While such software tools to test software assist in uncovering potential problems that hinder the globalization of the application, such as functional issues, these tools fail to automatically detect truncation and overlap defects on the webpage.

The embodiments of the present disclosure provide a means for automatically detecting truncation and overlap defects on the webpage by performing an intersection over union calculation, such as for adjacent webpage elements, and using such information in connection with the location relationship between such elements as well as whether either of the elements contain text to determine whether or not a truncation or overlap defect was detected.

In some embodiments of the present disclosure, the present disclosure comprises a computer-implemented method, system and computer program product for detecting truncation and overlap defects. In one embodiment of the present disclosure, location and size information for the elements of the webpage are obtained. An intersection over union (IoU) calculation is performed for two webpage elements on the webpage using the obtained location and size information for at least one of these two webpage elements. In one embodiment, the intersection over union (IoU) calculation equals: $|A \cap B|/|A \cup B|$, where A and B correspond to a first webpage element and a second webpage element on the webpage, respectively. Furthermore, the location relationship between these two webpage elements on the webpage is determined using the obtained location and size information for at least one of these two webpage elements. In one embodiment, "location relationship," as used herein, indicates the location scenario of the two webpage elements. A table, referred to herein as the "overlap and truncation situation type table," which defines truncation defect and overlap defect scenarios, is then reviewed to determine if there are any truncation or overlap defects in the two webpage elements using the IoU calculation, the location relationship and the text condition, which indicates whether text is included in one of the two webpage elements. Such a process is performed for various two webpage elements, such as two adjacent webpage elements, on the webpage. If there were any truncation or overlap defects detected in the webpage, then such truncation and/or overlap defects are marked on a screen capture of the webpage. In this manner, truncation and overlap defects are automatically detected on a webpage.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a web server 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and web server 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, web server 102 is configured to offer a social networking and/or microblogging service thereby enabling users of computing devices 101 to send and read other users' posts. "Posts," as used herein, include any one or more of the following: text (e.g., comments, sub-comments and replies), audio, video images, etc. Web server 102, as used herein, is configured to enable various collaborative activities, such as online discussion sites (e.g., public forums).

In one embodiment, web server 102 is configured to host websites (website is a collection of relevant webpages that is addressed to a Uniform Resource Locator (URL)) and serve contents to the World Wide Web. For example, web server 102 may host a website in which its collection of relevant webpages are accessed by a user of computing device 101, such as via a web browser (software application for accessing information on the World Wide Web) on computing device 101. Furthermore, web server 102 is configured to process incoming network requests over HTTP (Hypertext Transfer Protocol) and several other related protocols.

System 100 further includes a device, referred to herein as the "defect detector" 104, configured to detect truncation and overlap defects in a webpage shown to users 101 by web server 102, such as a webpage displayed on the display of computing device 101 that was accessed by a web browser on computing device 101 from web server 102. "Truncation defects," as used herein, refer to the situation in which at least a portion of a number string or a text string is shortened. "Overlap defects," as used herein, refer to the situation in which at least a portion of a webpage element extends over another webpage element so as to at least partially cover that webpage element.

In one embodiment, such defects are detected by performing an intersection over union calculation between two webpage elements, such as for adjacent webpage elements. Webpage elements, as used herein, refer to portions of the depicted webpage, which may contain a data item, text, image or perhaps nothing. Examples of webpage elements include, but not limited to, checkboxes, radio boxes, drop-down lists, list boxes, buttons, toggles, text fields, date fields, sliders, search fields, tags, icons, progress bars, message boxes, notifications, windows, accordions, etc.

Such information (intersection over union calculation between two webpage elements) may be used in connection with the location relationship between such webpage elements as well as whether either one of the webpage elements contain text to determine whether or not a truncation or overlap defect was detected as discussed in further detail below. A description of the software components of defect detector 104 is provided below in connection with FIG. 2 and a description of the hardware configuration of defect detector 104 is provided further below in connection with FIG. 5.

System 100 is not to be limited in scope to any one particular network architecture. System 100 may include any number of computing devices 101, web servers 102, networks 103 and defect detectors 104.

A discussion regarding the software components used by defect detector 104 to detect truncation and overlap defects, such as on a webpage, is discussed below in connection with FIG. 2.

Figure 2:
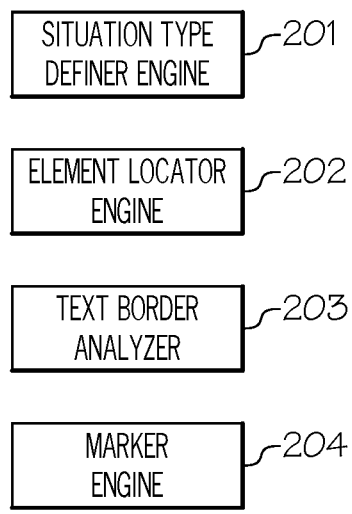
FIG. 2 is a diagram of the software components of the defect detector used to detect truncation and overlap defects in accordance with an embodiment of the present disclosure.

FIG. 2 is a diagram of the software components of defect detector 104 (FIG. 1) used to detect truncation and overlap defects, such as on a webpage, in accordance with an embodiment of the present disclosure.

Referring to FIG. 2, in conjunction with FIG. 1, defect detector 104 includes a situation type definer engine 201 configured to perform an intersection over union calculation with respect to two webpage elements using the location and size information of the webpage elements, such as a webpage element and an adjacent webpage element or a text border (webpage element) and the webpage element that encompasses at least a portion of the text border. In one embodiment, the intersection over union (IoU) calculation equals: $|A \cap B|/|A \cup B|$, where A and B correspond to a webpage element and an adjacent webpage element on the webpage, respectively. An illustration of performing the IoU calculation using the location and size information of the webpage elements is provided in FIG. 3 in accordance with an embodiment of the present disclosure. In one embodiment, as discussed further below, such location and size information is provided to situation type definer engine 201 by element locator engine 202.

Figure 3:
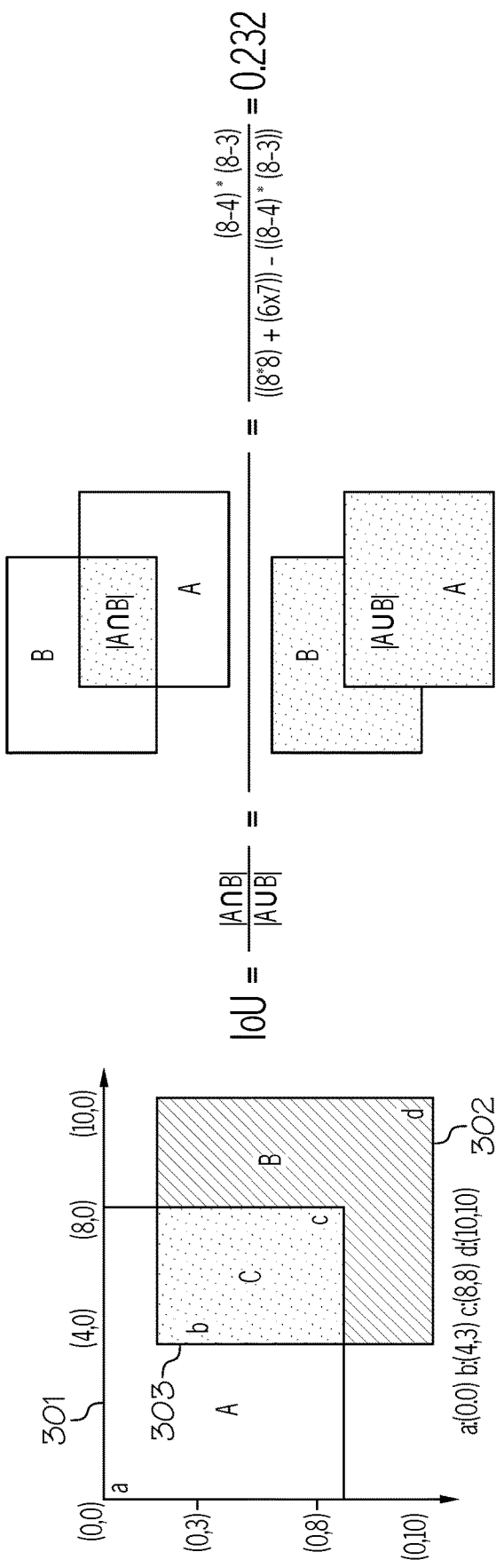
FIG. 3 illustrates performing the intersection over union (IoU) calculation in accordance with an embodiment of the present disclosure.

As shown in FIG. 3, webpage element A 301 overlaps webpage element B 302 with an area identified as "C" 303. As further shown in FIG. 3, the IoU=$|A \cap B|/|A \cup B|$, where $A \cap B$ refers to the intersection of the webpage elements A and B and where $A \cup B$ refers to the union of the webpage elements A and B as depicted in FIG. 3. As further illustrated in FIG. 3, using the location and size information of webpage elements A and B, the IoU of the webpage elements A and B is equal to 0.232. For example, $|A \cap B|$ is equal to $(8-4)*(8-3)$, which equals the value of 20, using the x, y coordinates of webpage elements A and B. In another example, $|A \cup B|$ is equal to $((8*8)+(6*7))-((8-4)*(8-3))$, which equals the value of 86, using the x, y coordinates of webpage elements A and B. Hence, $|A \cap B|/|A \cup B|$ is equal to 20/86, which equals 0.232.

In one embodiment, situation type definer engine 201 determines the location relationship between two webpage elements (e.g., webpage elements A and B of FIGS. 3 and 4) using the location and size information of these webpage elements determined by element locator engine 202 as discussed further below.

Furthermore, situation type definer engine 201 is configured to utilize a table, that is referred to herein as the "overlap and truncation situation type" table, to determine if there are any truncation and/or overlap defects on a webpage as shown below.

| | Overlap and Truncation Situation Type Table | | | |
|---|---|---|---|---|
| IoU | Location Relationship | A or B is Text | Result | Scenario |
| 0 < IoU < 1 | No adjoining the boundary for A and B, B out of A | N/A | Overlap | (1) |
| 0 < IoU < 1 | A and B are adjoining the boundary, B in A | N/A | Truncation | (2) |
| 0 < IoU < 1 | No adjoining the boundary for A and B, B in A | B is text, A is not | Normal | (3) |
| 0 < IoU < 1 | No adjoining the boundary for A and B, B in A | A is text, B is not | Overlap | (3) |
| 0 < IoU < 1 | No adjoining the boundary for A and B, B in A | Neither is text | Overlap | (3) |
| IoU = 0 | A and B are adjoining the boundary, B out of A | N/A | Truncation | (4) |
| IoU = 0 | No adjoining the boundary for A and B | N/A | Normal | (5) |
| IoU = 1 | N/A | N/A | Overlap | (6) |

In one embodiment, the overlap and truncation situation type table includes a listing of the IoU value (or range of IoU values) for webpage elements A and B, the location relationship between webpage elements A and B, the text condition (whether webpage element A or B or neither contain text) and the corresponding scenario (discussed below in connection with FIG. 4) and defect (if any) as discussed further below.

The "location relationship" of the table, as discussed below, indicates the various location scenarios of the two neighboring webpage elements, webpage elements A and B, as discussed further below.

Figure 4:
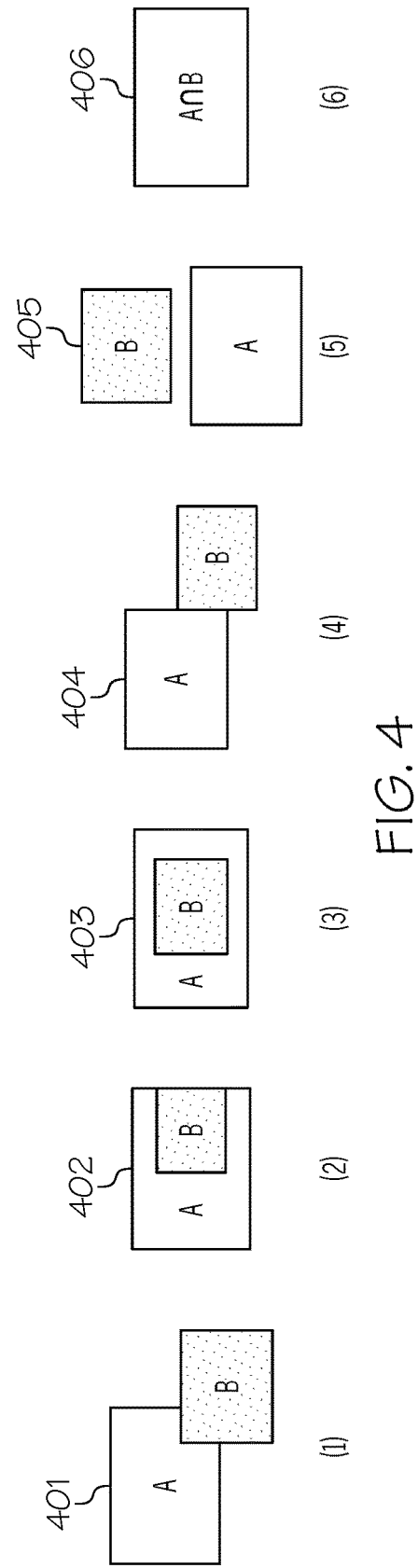
FIG. 4 illustrates six different scenarios for the positioning of one webpage element versus another webpage element in accordance with an embodiment of the present disclosure.

In one embodiment, the overlap and truncation situation type table ("table") is based on six different scenarios of the positioning of one webpage element versus another webpage element as illustrated in FIG. 4 in accordance with an embodiment of the present disclosure.

As illustrated in FIG. 4, there are six different scenarios involving the positioning of one webpage element versus another webpage element, including some scenarios demonstrating a truncation or an overlap defect.

Referring to scenario (1) 401 of FIG. 4, as shown in the table, there is an overlap defect with respect to webpage elements A and B. Such a scenario is defined in the overlap and truncation situation type table when the IoU for A and B is between 0 and 1, the location relationship corresponds to webpage element B being out of webpage element A with neither webpage element adjoining the boundary between them, and with the option of text within the webpage elements not being applicable (indicated as "N/A" in the table).

Referring to scenario (2) 402 of FIG. 4, as shown in the table, there is a truncation defect with respect to webpage elements A and B. Such a scenario is defined in the overlap and truncation situation type table when the IoU for A and B is between 0 and 1, the location relationship corresponds to the webpage elements A and B adjoining the boundary in which webpage element B is located within webpage element A, and with the option of text within the webpage elements not being applicable (indicated as "N/A" in the table).

Referring to scenario (3) 403 of FIG. 4, as shown in the table, there may be a "normal" result or condition (no truncation or overlap defect) when the IoU for A and B is between 0 and 1, the location relationship corresponds to webpage element B being located within webpage element A and neither webpage element adjoining the boundary between them, and with webpage element B containing text and webpage element A not containing text.

Referring to scenario (3) 403 of FIG. 4, as shown in the table, there is an overlap defect when the IoU for A and B is between 0 and 1, the location relationship corresponds to webpage element B being located within webpage element A and neither webpage element adjoining the boundary between them, and with webpage element A containing text and webpage element B not containing text.

Referring to scenario (3) 403 of FIG. 4, as shown in the table, there is an overlap defect when the IoU for A and B is between 0 and 1, the location relationship corresponds to webpage element B being located within webpage element A and neither webpage element adjoining the boundary between them, and with neither webpage element having text.

Referring to scenario (4) 404 of FIG. 4, as shown in the table, there is a truncation defect when the IoU for A and B equals 0, the location relationship corresponds to the webpage elements A and B adjoining the boundary in which webpage element B is located out of webpage element A, and with the option of text within the webpage elements not being applicable (indicated as "N/A" in the table).

Referring to scenario (5) 405 of FIG. 4, as shown in the table, there is a "normal" result or condition when the IoU for A and B equals 0, the location relationship corresponds to having neither webpage element A and B adjoining the boundary between them, and with the option of text within the webpage elements not being applicable (indicated as "N/A" in the table).

Referring to scenario (6) 406 of FIG. 4, as shown in the table, there is an overlap defect when the IoU for A and B equals 1, the location relationship not being applicable (indicated as "N/A" in the table) and with the option of text within the webpage elements not being applicable (indicated as "N/A" in the table).

As discussed further below, such a table will be used by defect detector 104 to determine if there are any truncation and/or overlap defects in the webpage currently being displayed on a display of computing device 101.

In one embodiment, such a table is populated by an expert and stored in a storage device (e.g., memory, disk drive) of defect detector 104.

In one embodiment, defect detector 104 further includes an element locator engine 202 configured to detect the location and size information of the webpage elements, such as the webpage elements of a webpage currently being displayed on a display of computing device 101. In one embodiment, element locator engine 202 identifies such webpage elements using a webpage reading tool (e.g., Java® HttpClient, JSoup, Java® HtmlCleaner, Apache® HttpClient, Jetty® HttpClient and Java® HtmlUnit). In one embodiment, such webpage reading tools extract the HTML (Hypertext Markup Language) code for the webpage, where the HTML code is used to structure the webpage and its content.

In one embodiment, element locator engine 202 identifies webpage elements on a webpage by the element identifier (ID) in the HTML code. The ID is an identifier for the element that is typically assigned by the developer of the code.

In another embodiment, element locator engine 202 identifies webpage elements on a webpage via field names in the HTML code. For example, each input field in a form may have a name, such as username and password fields.

In another embodiment, element locator engine 202 identifies webpage elements on a webpage via text in the HTML code. For example, links and buttons on a webpage that have visible text may be located in this manner.

In another embodiment, element locator engine 202 identifies webpage elements on a webpage via link text in the HTML code.

In another embodiment, element locator engine 202 identifies webpage elements on a webpage via the Cascading Style Sheets (CSS) class attribute in the HTML code. For example, using the CSS class attribute, element locator engine 202 is able to locate items that have a unique style on the webpage. For example, submit and login/logout buttons may be identified on the webpage since there is typically only one such element on the webpage with such a style. In one embodiment, element locator engine 202 locates an element with a specific CSS class attribute, which may be supplied via a list of CSS class attributes in a data structure (e.g., table). Such a data structure may be populated by an expert and stored in a storage device (e.g. memory, disk drive) of defect detector 104.

In another embodiment, element locator engine 202 identifies webpage elements on a webpage via XPath. XPath is a language for traversing the structure of the DOM (document object model) of the webpage.

In another embodiment, element locator engine 202 identifies webpage elements on a webpage from web server 102 providing defect detector 104 user interface metadata that describes the contents and layouts of the user interface elements, including the size of the user interface elements and the location of the user interface elements (e.g., x-y coordinates on the display screen).

In another embodiment, element locator engine 202 identifies webpage elements via the DOM tree of the webpage currently rendered in the browser of computing device 101. In one embodiment, element locator engine 202 utilizes the Chrome DevTools elements panel to identify the elements on the webpage.

Once the webpage element is located, element locator engine 202 determines the location and size information of the webpage elements (e.g., x-y coordinate on the display screen of computing device 101). As discussed above, in one embodiment, such information may be obtained via user interface metadata that describes the contents and layouts of the user interface elements, including the size of the user interface elements and the location of the user interface elements (e.g., x-y coordinates on the display screen).

Furthermore, in one embodiment, element locator engine 202 determines the location and size information of the webpage elements (e.g., x-y coordinates on the display screen of computing device 101) identified in the HTML code via the use of the HTMLElement.offsetWidth and HTMLElement.offsetHeight properties. Other properties that may be used to obtain such information include Element.clientWidth, Element.clientHeight, Element.scrollWidth and Element.scrollHeight properties.

In one embodiment, the extracted location and size information for the webpage elements are stored in a file (e.g., JSON file) by element locator engine 202.

In one embodiment, element locator engine 202 may also obtain the name of the webpage element from the HTML code as well as any text (e.g., text string) within the webpage element based on analyzing the HTML attributes and tags. For example, the name attribute may be used to specify a name. In another example, the <blockquote> tag may indicate a section that is quoted from another source. In a further example, the <textarea> tag defines the text area. In one embodiment, element locator engine 202 may search for such attributes and tags in the HTML code based on a listing of such attributes and tags in a data structure (e.g., table) stored in the storage device (e.g., memory, disk drive) of defect detector 104.

In one embodiment, after extracting the location and size information for the webpage elements, element locator engine 202 obtains a screen capture of the webpage, such as using a screenshot tool (e.g., Snagit®, screenpresso, picpick, Jing®, winsnap, greenshot, etc.).

Defect detector 104 further includes a text border analyzer 203 configured to identify a text border of a text area of a webpage area by performing a horizontal and a vertical projection of the text area.

Defect detector 104 further includes a marker engine 204 configured to mark in the screen capture of the webpage any identified truncation or overlap defects.

A further description of these and other functions is provided below in connection with the discussion of the method for detecting truncation and overlap defects.

Prior to the discussion of the method for detecting truncation and overlap defects, a description of the hardware configuration of defect detector 104 (FIG. 1) is provided below in connection with FIG. 5.

Figure 5:
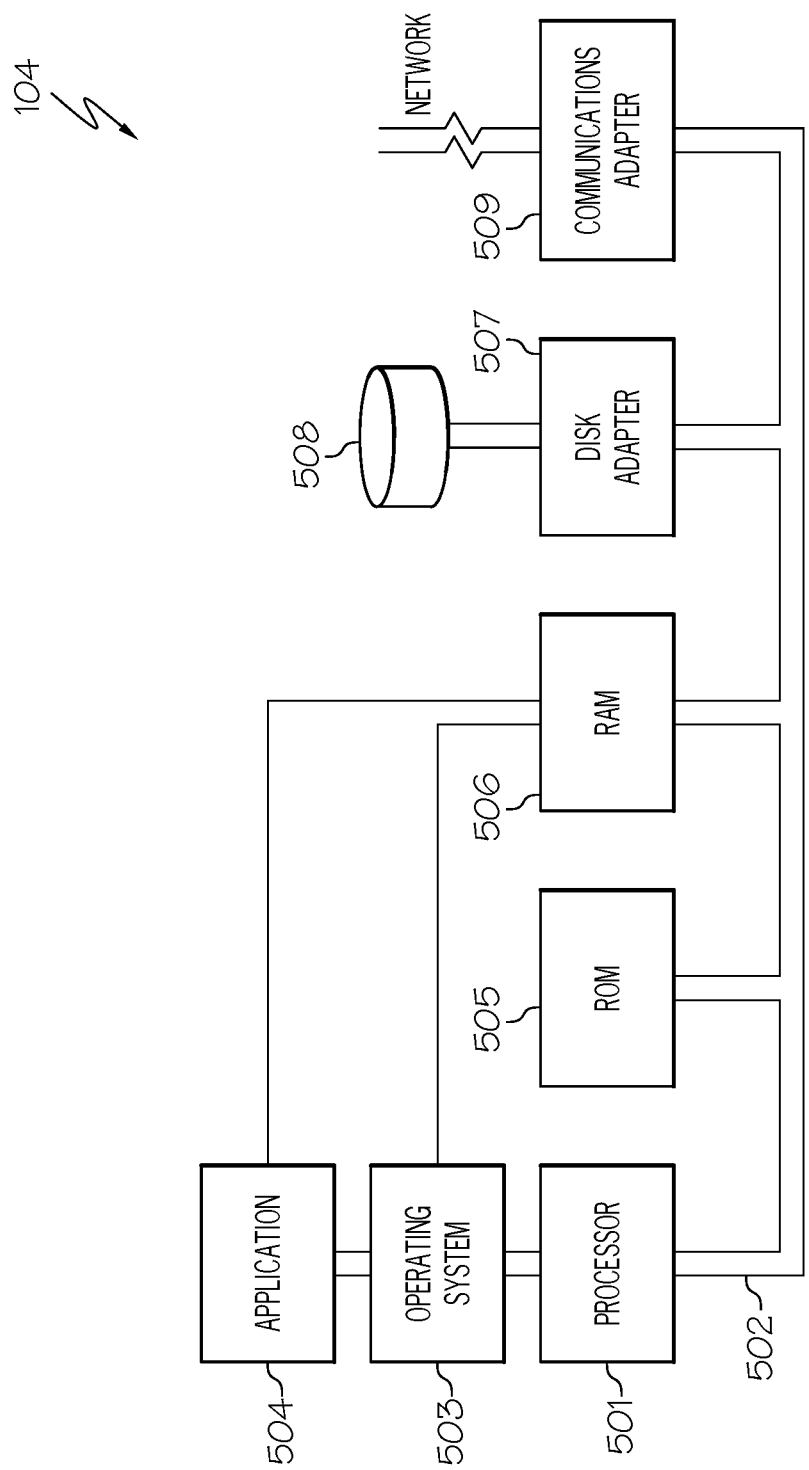
FIG. 5 illustrates an embodiment of the present disclosure of the hardware configuration of the defect detector which is representative of a hardware environment for practicing the present disclosure.

Referring now to FIG. 5, FIG. 5 illustrates an embodiment of the present disclosure of the hardware configuration of defect detector 104 (FIG. 1) which is representative of a hardware environment for practicing the present disclosure.

Defect detector 104 has a processor 501 connected to various other components by system bus 502. An operating system 503 runs on processor 501 and provides control and coordinates the functions of the various components of FIG. 5. An application 504 in accordance with the principles of the present disclosure runs in conjunction with operating system 503 and provides calls to operating system 503 where the calls implement the various functions or services to be performed by application 504. Application 504 may include, for example, situation type definer engine 201 (FIG. 2), element locator engine 202 (FIG. 2), text border analyzer 203 (FIG. 2) and marker engine 204 (FIG. 2). Furthermore, application 504 may include, for example, a program for detecting truncation and overlap defects as discussed further below in connection with FIGS. 6-9.

Referring again to FIG. 5, read-only memory ("ROM") 505 is connected to system bus 502 and includes a basic input/output system ("BIOS") that controls certain basic functions of defect detector 104. Random access memory ("RAM") 506 and disk adapter 507 are also connected to system bus 502. It should be noted that software components including operating system 503 and application 504 may be loaded into RAM 506, which may be defect detector's 104 main memory for execution. Disk adapter 507 may be an integrated drive electronics ("IDE") adapter that communicates with a disk unit 508, e.g., disk drive. It is noted that the program for detecting truncation and overlap defects, as discussed further below in connection with FIGS. 6-9, may reside in disk unit 508 or in application 504.

Defect detector 104 may further include a communications adapter 509 connected to bus 502. Communications adapter 509 interconnects bus 502 with an outside network (e.g., network 103 of FIG. 1) to communicate with other devices, such as computing devices 101 (FIG. 1), web server 102 (FIG. 1), etc.

In one embodiment, application 504 of defect detector 104 includes the software components of situation type definer engine 201, element locator engine 202, text border analyzer 203 and marker engine 204. In one embodiment, such components may be implemented in hardware, where such hardware components would be connected to bus 502. The functions discussed above performed by such components are not generic computer functions. As a result, defect detector 104 is a particular machine that is the result of implementing specific, non-generic computer functions.

In one embodiment, the functionality of such software components (e.g., situation type definer engine 201, element locator engine 202, text border analyzer 203 and marker engine 204) of defect detector 104, including the functionality for detecting truncation and overlap defects, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, truncation and overlap defects on a depicted webpage make it difficult for the user to understand what is shown on the webpage. In software testing, test automation is the use of software separate from the software being tested to control the execution of tests and the comparison of actual outcomes with predicted outcomes. For example, in the area of internalization and localization, software tools, such as globalization tools, have been developed to ensure that the software product is stable in terms of both its functionalities as well as representation of data in spite of varying cultures/locales. Such globalization tools engage in globalization testing to validate whether an application acknowledges all the language input texts and it can be used across the globe or not. The sole aim of globalization testing is to uncover the potential problems that could hinder the globalization of the application. For example, globalization testing involves internationalization testing, which is to verify if the code can deal with all the international support with no breaking of functionality that may cause data loss or data integrity issues. In another example, globalization testing involves localization testing, which involves translation of the software and its presentation to the end user. The translation of the program considers icons, graphics, user manuals, help files, documentation and other cultural specifications. While such software tools to test software assist in uncovering potential problems that hinder the globalization of the application, such as functional issues, these tools fail to automatically detect truncation and overlap defects on the webpage.

Figure 6:
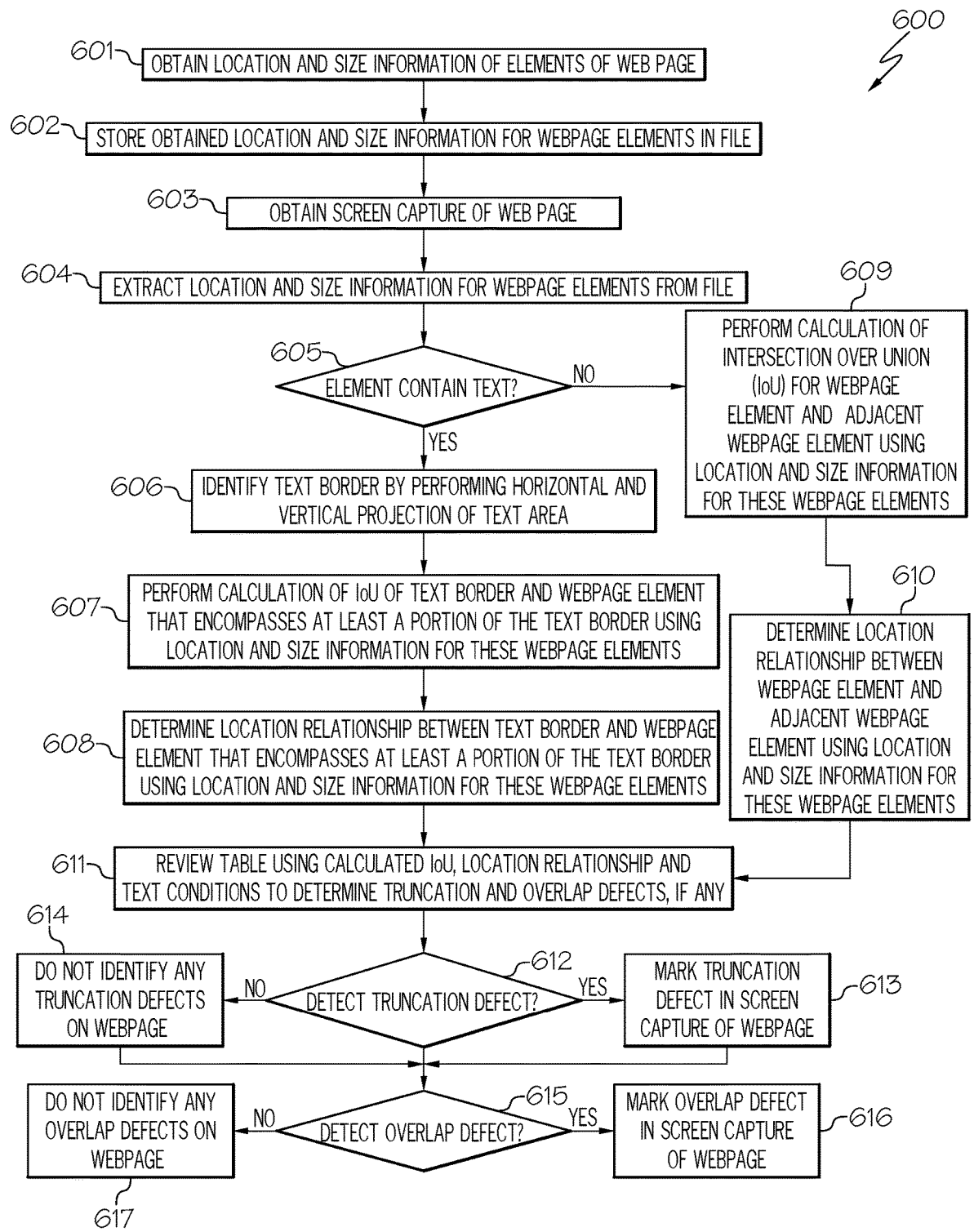
FIG. 6 is a flowchart of a method for detecting truncation and overlap defects in accordance with an embodiment of the present disclosure.
Figure 7:
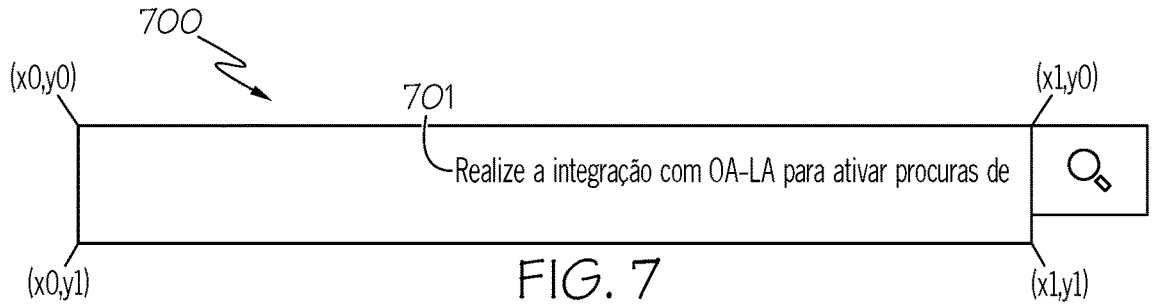
FIG. 7 illustrates a webpage element containing text in accordance with an embodiment of the present disclosure.
Figure 8:
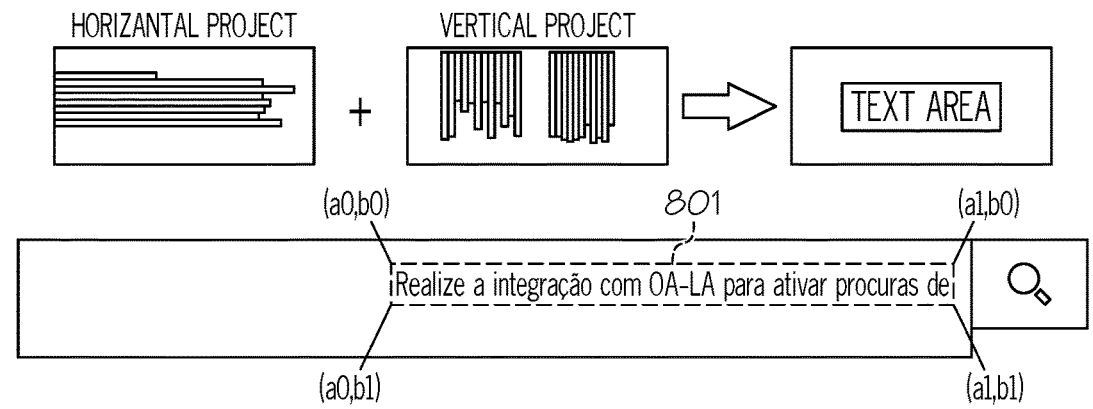
FIG. 8 illustrates performing horizontal and vertical projection of the text area in accordance with an embodiment of the present disclosure.
Figure 9:
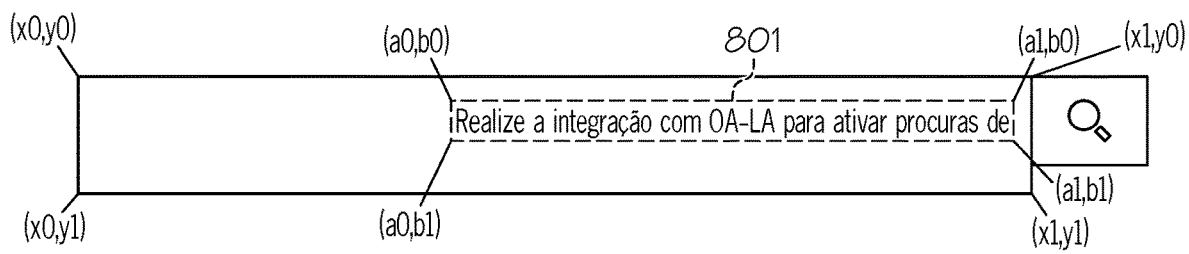
FIG. 9 illustrates performing the IoU calculation of the text border and the webpage element that encompasses at least a portion of the text border in accordance with an embodiment of the present disclosure.

The embodiments of the present disclosure provide a means for automatically detecting truncation and overlap defects on the webpage by performing an intersection over union calculation, such as for adjacent webpage elements, and using such information in connection with the location relationship between such elements as well as whether either one of the elements contain text to determine whether or not a truncation or overlap defect was detected as discussed below in connection with FIGS. 6-9. FIG. 6 is a flowchart of a method for detecting truncation and overlap defects. FIG. 7 illustrates a webpage element containing text. FIG. 8 illustrates performing horizontal and vertical projection of the text area. FIG. 9 illustrates performing the IoU calculation of the text border and the webpage element that encompasses at least a portion of the text border.

As stated above, FIG. 6 is a flowchart of a method 600 for detecting truncation and overlap defects in accordance with an embodiment of the present disclosure.

Referring to FIG. 6, in conjunction with FIGS. 1-5, in step 601, element locator engine 202 of defect detector 104 obtains the location and size information of the elements of the webpage (webpage elements). As discussed above, in one embodiment, element locator engine 202 identifies such webpage elements using a webpage reading tool (e.g., Java® HttpClient, JSoup, Java® HtmlCleaner, Apache® HttpClient, Jetty® HttpClient and Java® HtmlUnit). In one embodiment, such webpage reading tools extract the HTML (Hypertext Markup Language) code for the webpage, where the HTML code is used to structure the webpage and its content.

Furthermore, as discussed above, in one embodiment, element locator engine 202 identifies webpage elements on a webpage via the element identifier (ID) in the HTML code, field names in the HTML code, text in the HTML code, link text in the HTML code, Cascading Style Sheets (CSS) class attributes in the HTML code, XPath, user interface metadata, the DOM tree of the webpage currently rendered in the browser of computing device 101, etc.

Additionally, as discussed above, in one embodiment, element locator engine 202 determines the location and size information of the webpage elements (e.g., x-y coordinates on the display screen of computing device 101) via the user interface metadata and/or HTMLElement.offsetWidth, HTMLElement.offsetHeight, Element.clientWidth, Element.clientHeight, Element.scrollWidth and Element.scrollHeight properties.

In one embodiment, element locator engine 202 may also obtain the name of the webpage element from the HTML code as well as any text (e.g., text string) within the webpage element based on analyzing the HTML attributes and tags. For example, the name attribute may be used to specify a name. In another example, the <blockquote> tag may indicate a section that is quoted from another source. In a further example, the <textarea> tag defines the text area. In one embodiment, element locator engine 202 may search for such attributes and tags in the HTML code based on a listing of such attributes and tags in a data structure (e.g., table) stored in the storage device (e.g., memory, disk drive) of defect detector 104.

In step 602, element locator engine 202 of defect detector 104 stores the obtained location and size information for the webpage elements in a file. For example, such obtained location and size information for the webpage elements may be stored in a JSON file. In one embodiment, such a file is stored in the storage medium (e.g., memory, disk drive) of defect detector 104. In one embodiment, information, such as the name of the webpage element and any text within the webpage element, may also be stored in the file.

The following presents an example of such a JSON file storing the obtained location and size information for the webpage elements, including the name, type, etc. of the webpage elements.

---

{
    "(@)FindBy(xpath = "//pre[contains(.,'[   {   "kind": "Status", "apiVersion": "v1", "metadata": { }, "status": "Failure", "message": "applications,app.k8s.io \"acme-railways-ticketing-gbapp\"", "details": {    "name": "acme-railways-ticketing-gbapp", "group": "app.k8s.io", "kind": "applications" }, "code": 409 }]')]")":
  {
    "Page Title": "Painel do Aplicativo",
    "Element Name": "Digitar texto da",
      "Type": div,
        "X": 581,
        "Y": 51,
      "Height": 30,
      "Width": 387,
  }
{

---

After obtaining and storing the location and size information for the webpage elements on the webpage, in step 603, element locator engine 202 of defect detector 104 obtains a screen capture of the webpage, such as using a screenshot tool (e.g., Snagit®, screenpresso, picpick, Jing®, winsnap, greenshot, etc.).

In step 604, situation type definer engine 201 of defect detector 104 extracts the location and size information for the webpage elements from the file (e.g., JSON file). A JSON file is a standard text-based format for representing structured data based on JavaScript® object syntax. In one embodiment, such information is extracted from the JSON file via the json.load( ) method in Python®, which will be stored as a Python® dictionary. Once loaded, particular data can be fetched by specifying the field, which represents the key in the dictionary.

In one embodiment, situation type definer engine 201 opens the JSON file with a text editor (e.g., Microsoft® notepad, GNU nano, TextEdit, etc.). Once opened, situation type definer engine 201 may search and identify location and size information in the JSON file by identify terms, such as "X" for x-coordinate, "Y" for y-coordinate, "Height" for the height of the element, and "Width" for the width of the element. The corresponding element may be identified in the JSON file by identifying the term "element name" associated with such information, where the name of the element is listed after the term "element name."

For each webpage element on the webpage, the following steps are performed.

In step 605, a determination is made by element locator engine 202 of defect detector 104 as to whether the webpage element contains text.

In one embodiment, element locator engine 202 locates the webpage element on the webpage using the extracted location information and determines if there is text within such a location on the webpage. For instance, element locator engine 202 may search for any alphanumeric characters. Finding such characters may be an indication of text within the webpage element.

In another example, the file (e.g., JSON file) may include information, such as the name of the webpage element and any text within the webpage element. As a result, element locator engine 202 may determine whether the webpage element contains any text based on whether the file (e.g., JSON file) indicates that the webpage element contains text.

If there is a webpage element that contains text, then, in step 606, text border analyzer 203 of defect detector 104 identifies the text border by performing horizontal and vertical projection of the text area as illustrated in FIGS. 7 and 8.

FIG. 7 illustrates a webpage element containing text in accordance with an embodiment of the present disclosure. FIG. 8 illustrates performing horizontal and vertical projection of the text area in accordance with an embodiment of the present disclosure.

Referring to FIG. 7, in one embodiment, the coordinates of the webpage element containing text is extracted from the file as previously discussed in step 604. For example, webpage element 700 includes the text 701 of "Realize a integraεão com OA-LA para ativar procuras de." The coordinates of webpage element 700 corresponds to (x0, y0), (x1, y0), (x0, y1), (x1, y1). Such information may be extracted from the file (e.g., JSON file) by situation type definer engine 201 in step 604 as previously discussed.

After obtaining such coordinates, text border analyzer 203 projects the text area, such as the area of text 701 of FIG. 7, horizontally and vertically to obtain the maximum border of text as shown in FIG. 8.

Referring to FIG. 8, in one embodiment, text border analyzer 203 projects the text area, such as the area of text 701 of FIG. 7, horizontally and vertically to obtain the maximum border 801 of text in each line (e.g., (a0, b0), (a1, b0), (a0, b1), (a1, b1)) as shown in FIG. 8.

Referring to FIG. 6, in conjunction with FIGS. 1-5 and 7-8, in step 607, situation type definer engine 201 performs the calculation of the IoU of the webpage elements (e.g., the text border and the webpage element that encompasses at least a portion of the text border) using the location and size information of these webpage elements (i.e., using the location and size information of the text border and the webpage element that encompasses at least a portion of the text border obtained in steps 604, 606) as shown in FIG. 9.

FIG. 9 illustrates performing the IoU calculation of the text border and the webpage element that encompasses at least a portion of the text border in accordance with an embodiment of the present disclosure.

As shown in FIG. 9, the IoU of the text border and the webpage element that encompasses at least a portion of the text border is the following:

$$\frac{|[\min(a1, x1) - \max(a0, x0)] * \min(y1, b1) - \max(y0, b0)]|}{|(x1 - x0) * (y1 - y0) + (a1 - a0) * (b1 - b0) - [\min(a1, x1) - \max(a0, x0)] * \min(y1, b1) - \max(y0, b0)]|}$$

Such an IoU will be used to determine whether there is a truncation or an overlap defect as discussed further below.

Returning to FIG. 6, in conjunction with FIGS. 1-5 and 7-9, in step 608, situation type definer engine 201 determines the location relationship between the webpage elements (e.g., the text border and the webpage element that encompasses at least a portion of the text border) using the location and size information of the text border and the webpage element that encompasses at least a portion of the text border (obtained in steps 604, 606). As discussed above, the "location relationship" indicates the various location scenarios (one of six possible scenarios) of the two webpage elements as shown in FIG. 4. For example, using the location and size information of the text border (e.g., (a0, b0), (a1, b0), (a0, b1), (a1, b1)) and the webpage element that encompasses at least a portion of the text border (e.g., (x0, y0), (x1, y0), (x0, y1), (x1, y1)), such as shown in FIG. 9, the particular location scenario (e.g., scenario 2 402), as shown in FIG. 4, can be determined.

Referring again to step 605, if however, the webpage element does not contain text, then, in step 609, situation type definer engine 201 performs the calculation of the intersection over union (IoU) for the webpage element and the adjacent webpage element using the location and size information for these webpage elements (obtained in step 604) as previously discussed above in connection with FIG. 3. For example, as shown in FIG. 3, webpage element A 301 overlaps webpage element B 302 with an area identified as "C" 303. As further shown in FIG. 3, the IoU=|A∩B|/|A∪B|, where A∩B refers to the intersection of the webpage elements A and B and where A∪B refers to the union of the webpage elements A and B as depicted in FIG. 3. As further illustrated in FIG. 3, using the location and size information of webpage elements A and B, the IoU of the webpage elements A and B is equal to 0.232. For example, |A∩B| is equal to (8−4)*(8−3), which equals the value of 20, using the x, y coordinates of webpage elements A and B. In another example, |A∪B| is equal to ((8*8)+(6*7))−((8−4)*(8−3)), which equals the value of 86, using the x, y coordinates of webpage elements A and B. Hence, |A∩B|/|A∪B| is equal to 20/86, which equals 0.232.

In step 610, situation type definer engine 201 determines the location relationship between the webpage element and the adjacent webpage element using the location and size information for these webpage elements (obtained in step 604) as previously discussed. For example, situation type definer engine 201 may extract the x, y coordinates of the webpage elements from a file (e.g., JSON file) in step 604. Such information may be used to determine the location and size of each of these webpage elements as well as the location relationship between such webpage elements.

As previously discussed, in one embodiment, the location relationship information is obtained from the file (e.g., JSON file) in step 604 which indicates the coordinates of the webpage elements, such as neighboring webpage elements. Such coordinates enable situation type definer engine 201 to define the location scenario, such as one of the six location scenarios as shown in FIG. 4, between adjacent or neighboring webpage elements. "Adjacent webpage elements," or "neighboring webpage elements," as used herein, refer to webpage elements that are located in close proximity to one another, including having a portion or the entirety of one of the webpage elements being located within another webpage element, as shown in FIG. 4. That is, "adjacent webpage elements," or "neighboring webpage elements," as used herein, refer to the webpage elements, such as webpage elements A and B, that are located with respect to one another in one of the six possible location scenarios as shown in FIG. 4.

After determining the location relationship between the webpage elements in steps 608, 610, in step 611, situation type definer engine 201 of defect detector 104 reviews the table (overlap and truncation situation type table) using the calculated IoU, the location relationship and text conditions to determine if there are any truncation or overlap defects. That is, situation type definer engine 201 reviews the table to identify a normal condition, a truncation defect or an overlap defect using the calculated IoU, the location relationship and text conditions. Step 611, and the following steps 612-617, are performed for each pair of webpage elements identified on the webpage to determine if there are any truncation or overlap defects on the webpage.

In one embodiment, "text conditions," as used herein, refer to whether text is located within the webpage element. In one embodiment, as previously discussed, element locator engine 202 determines whether there is text located within the webpage element in step 605.

For example, in one embodiment, element locator engine 202 locates the webpage element on the webpage using the extracted location information and determines if there is text within such a location on the webpage. For instance, element locator engine 202 may search for any alphanumeric characters. Finding such characters may be an indication of text within the webpage element.

In another example, the file (e.g., JSON file) may include information, such as the name of the webpage element and any text within the webpage element. As a result, element locator engine 202 may determine whether the webpage element contains any text based on whether the file (e.g., JSON file) indicates that the webpage element contains text.

Such information (determining whether the webpage element contains text) is used by situation type definer engine 201 when reviewing the table to determine if there are any truncation or overlap defects.

Referring to the overlap and truncation situation type table discussed above, situation type definer engine 201 is able to determine if there are any truncation or overlap defects using the calculated IoU, the location relationship and text conditions. For example, referring to FIG. 3, such a location relationship corresponds to scenario 401 of FIG. 4. Using the IoU for the webpage elements depicted in FIG. 3 (0.232) and the location relationship (no adjoining the boundary for webpage elements A and B, where webpage element B is out of webpage element A), situation type definer engine 201 determines an overlap defect based on matching such information with the first row of the overlap and truncation situation type table (IoU is between 0 and 1 and there is "no adjoining the boundary for A and B, B out of A").

In step 612, situation type definer engine 201 determines if a truncation defect was detected. If a truncation defect was detected, then, for each truncation defect detected, in step 613, marker engine 204 of defect detector 104 marks the truncation defect in the screen capture of the webpage (performed in step 603). In one embodiment, such a marking may involve an annotation in close proximity to the truncation defect, where the annotation indicates the truncation defect, such as via the words "truncation defect." Other markings may include highlighting around the truncation defect, change in color around the truncation defect, etc.

If, however, there were no truncation defects detected, then, in step 614, situation type definer engine 201 does not identify any truncation defects.

Upon not identifying any truncation defects or upon marking the truncation defect(s) in the screen capture of the webpage, in step 615, situation type definer engine 201 determines if an overlap defect was detected.

If an overlap defect was detected, then, for each overlap defect detected, in step 616, marker engine 204 of defect detector 104 marks the overlap defect in the screen capture of the webpage (performed in step 603). In one embodiment, such a marking may involve an annotation in close proximity to the overlap defect, where the annotation indicates the overlap defect, such as via the words "overlap defect." Other markings may include highlighting around the overlap defect, change in color around the overlap defect, etc.

If, however, there were no overlap defects detected, then, in step 617, situation type definer engine 201 does not identify any overlap defects.

In this manner, the principles of the present disclosure detect truncation and overlap defects on a webpage.

As a result of the foregoing, embodiments of the present disclosure provide a means for automatically detecting truncation and overlap defects on the webpage by performing an intersection over union calculation, such as for adjacent webpage elements, and using such information in connection with the location relationship between such elements as well as whether either of the elements contain text to determine whether or not a truncation or overlap defect was detected.

Furthermore, the present disclosure improves the technology or technical field involving software testing. As discussed above, truncation and overlap defects on a depicted webpage make it difficult for the user to understand what is shown on the webpage. In software testing, test automation is the use of software separate from the software being tested to control the execution of tests and the comparison of actual outcomes with predicted outcomes. For example, in the area of internalization and localization, software tools, such as globalization tools, have been developed to ensure that the software product is stable in terms of both its functionalities as well as representation of data in spite of varying cultures/locales. Such globalization tools engage in globalization testing to validate whether an application acknowledges all the language input texts and it can be used across the globe or not. The sole aim of globalization testing is to uncover the potential problems that could hinder the globalization of the application. For example, globalization testing involves internationalization testing, which is to verify if the code can deal with all the international support with no breaking of functionality that may cause data loss or data integrity issues. In another example, globalization testing involves localization testing, which involves translation of the software and its presentation to the end user. The translation of the program considers icons, graphics, user manuals, help files, documentation and other cultural specifications. While such software tools to test software assist in uncovering potential problems that hinder the globalization of the application, such as functional issues, these tools fail to automatically detect truncation and overlap defects on the webpage.

Embodiments of the present disclosure improve such technology by obtaining location and size information for the elements of the webpage. An intersection over union (IoU) calculation is performed for two webpage elements on the webpage using the obtained location and size information for at least one of these two webpage elements. In one embodiment, the intersection over union (IoU) calculation equals: $|A \cap B|/|A \cup B|$, where A and B correspond to a first webpage element and a second webpage element on the webpage, respectively. Furthermore, the location relationship between these two webpage elements on the webpage is determined using the obtained location and size information for at least one of these two webpage elements. In one embodiment, "location relationship," as used herein, indicates the location scenario of the two webpage elements. A table, referred to herein as the "overlap and truncation situation type table," which defines truncation defect and overlap defect scenarios, is then reviewed to determine if there are any truncation or overlap defects in the two webpage elements using the IoU calculation, the location relationship and the text condition, which indicates whether text is included in one of the two webpage elements. Such a process is performed for various two webpage elements, such as two adjacent webpage elements, on the webpage. If there were any truncation or overlap defects detected in the webpage, then such truncation and/or overlap defects are marked on a screen capture of the webpage. In this manner, truncation and overlap defects are automatically detected on a webpage. Furthermore, in this manner, there is an improvement in the technical field involving software testing.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for detecting truncation and overlap defects on a webpage, the method comprising:
    performing an intersection over union (IoU) calculation for a first webpage element and a second webpage element on said webpage;
    determining a location relationship between said first and second webpage elements on said webpage;
    reviewing a table using said IoU calculation for said first and second webpage elements on said webpage and said location relationship between said first and second webpage elements to match one of a set of possible location scenarios listed in said table, wherein said set of possible location scenarios comprises a normal condition, a truncation defect and an overlap defect, wherein said normal condition corresponds to a condition that is not said truncation defect or said overlap defect; and
    marking a truncation defect or an overlap defect on a screen capture of said webpage in response to identifying said truncation defect or said overlap defect, respectively, in said table.

2. The method as recited in claim 1 further comprising:
    identifying a text border of a text area of said first webpage element by performing a horizontal and a vertical projection of said text area in response to identifying text within said second webpage element, wherein said first webpage element comprises said identified text border of said text area of said second webpage element.

3. The method as recited in claim 2 further comprising:
    reviewing said table using said IoU calculation for said first and second webpage elements on said webpage, said location relationship between said first and second webpage elements and a text condition to identify said normal condition, said truncation defect or said overlap defect, wherein said text condition indicates whether text is included in a webpage element.

4. The method as recited in claim 1 further comprising:
    obtaining location and size information for elements of said webpage;
    storing said obtained location and size information for said webpage elements in a file; and
    extracting location and size information for at least one of said first and second webpage elements from said file.

5. The method as recited in claim 1, wherein said IoU calculation equals: $|A \cap B|/|A \cup B|$, where A and B correspond to said first webpage element and said second webpage element on said webpage, respectively.

6. The method as recited in claim 1, wherein said table comprises a listing of truncation defects, overlap defects and normal conditions based on six different location scenarios between said first webpage element and said second webpage element on said webpage.

7. The method as recited in claim 1, wherein said first and second webpage elements comprise one or more of the following: a checkbox, a radio box, a dropdown list, a list box, a button, a toggle, a text field, a date field, a slider, a search field, a tag, an icon, a progress bar, a message box, a notification, a window, and an accordion.

8. A computer program product for detecting truncation and overlap defects on a webpage, the computer program product comprising one or more computer readable storage mediums having program code embodied therewith, the program code comprising programming instructions for:
    performing an intersection over union (IoU) calculation for a first webpage element and a second webpage element on said webpage;
    determining a location relationship between said first and second webpage elements on said webpage;
    reviewing a table using said IoU calculation for said first and second webpage elements on said webpage and said location relationship between said first and second webpage elements to match one of a set of possible location scenarios listed in said table, wherein said set of possible location scenarios comprises a normal condition, a truncation defect and an overlap defect, wherein said normal condition corresponds to a condition that is not said truncation defect or said overlap defect; and
    marking a truncation defect or an overlap defect on a screen capture of said webpage in response to identifying said truncation defect or said overlap defect, respectively, in said table.

9. The computer program product as recited in claim 8, wherein the program code further comprises the programming instructions for:
    identifying a text border of a text area of said first webpage element by performing a horizontal and a vertical projection of said text area in response to identifying text within said second webpage element, wherein said first webpage element comprises said identified text border of said text area of said second webpage element.

10. The computer program product as recited in claim 9, wherein the program code further comprises the programming instructions for:
    reviewing said table using said IoU calculation for said first and second webpage elements on said webpage, said location relationship between said first and second webpage elements and a text condition to identify said normal condition, said truncation defect or said overlap defect, wherein said text condition indicates whether text is included in a webpage element.

11. The computer program product as recited in claim 8, wherein the program code further comprises the programming instructions for:
    storing said obtained location and size information for said webpage elements in a file; and
    extracting location and size information for at least one of said first and second webpage elements from said file.

12. The computer program product as recited in claim 8, wherein said IoU calculation equals: $|A \cap B|/|A \cup B|$, where A and B correspond to said first webpage element and said second webpage element on said webpage, respectively.

13. The computer program product as recited in claim 8, wherein said table comprises a listing of truncation defects, overlap defects and normal conditions based on six different location scenarios between said first webpage element and said second webpage element on said webpage.

14. The computer program product as recited in claim 8, wherein said first and second webpage elements comprise one or more of the following: a checkbox, a radio box, a dropdown list, a list box, a button, a toggle, a text field, a date field, a slider, a search field, a tag, an icon, a progress bar, a message box, a notification, a window, and an accordion.

15. A system, comprising:
    a memory for storing a computer program for detecting truncation and overlap defects on a webpage; and
    a processor connected to said memory, wherein said processor is configured to execute program instructions of the computer program comprising:
        performing an intersection over union (IoU) calculation for a first webpage element and a second webpage element on said webpage;
        determining a location relationship between said first and second webpage elements on said webpage;
        reviewing a table using said IoU calculation for said first and second webpage elements on said webpage and said location relationship between said first and second webpage elements to match one of a set of possible location scenarios listed in said table, wherein said set of possible location scenarios comprises a normal condition, a truncation defect and an overlap defect, wherein said normal condition corresponds to a condition that is not said truncation defect or said overlap defect; and
        marking a truncation defect or an overlap defect on a screen capture of said webpage in response to identifying said truncation defect or said overlap defect, respectively, in said table.

16. The system as recited in claim 15, wherein the program instructions of the computer program further comprise:
    identifying a text border of a text area of said first webpage element by performing a horizontal and a vertical projection of said text area in response to identifying text within said second webpage element, wherein said first webpage element comprises said identified text border of said text area of said second webpage element.

17. The system as recited in claim 16, wherein the program instructions of the computer program further comprise:
    reviewing said table using said IoU calculation for said first and second webpage elements on said webpage, said location relationship between said first and second webpage elements and a text condition to identify said normal condition, said truncation defect or said overlap defect, wherein said text condition indicates whether text is included in a webpage element.

18. The system as recited in claim 15, wherein the program instructions of the computer program further comprise:
    obtaining location and size information for elements of said webpage;
    storing said obtained location and size information for said webpage elements in a file; and
    extracting location and size information for at least one of said first and second webpage elements from said file.

19. The system as recited in claim 15, wherein said IoU calculation equals: $|A \cap B|/|A \cup B|$, where A and B correspond to said first webpage element and said second webpage element on said webpage, respectively.

20. The system as recited in claim 15, wherein said table comprises a listing of truncation defects, overlap defects and normal conditions based on six different location scenarios between said first webpage element and said second webpage element on said webpage.

* * * * *